United States Patent [19]
Boot et al.

[11] Patent Number: 5,896,377
[45] Date of Patent: Apr. 20, 1999

[54] BROADBAND/NARROWBAND INTERWORKING

[75] Inventors: Gordon P Boot, Cotgrave; Peter J Briggs, Rugby, both of United Kingdom

[73] Assignee: Siemens GEC Communication Systems Limited, United Kingdom

[21] Appl. No.: 08/800,487

[22] Filed: Feb. 14, 1997

[30] Foreign Application Priority Data

Feb. 17, 1996 [GB] United Kingdom ............... 9603398

[51] Int. Cl.$^6$ ................................................ H04L 12/66
[52] U.S. Cl. .................... 370/352; 370/401; 370/410; 370/465
[58] Field of Search ...................... 370/352, 353, 370/398, 399, 400, 401, 410, 465, 466, 467, 522, 395, 524, 396

[56] References Cited

U.S. PATENT DOCUMENTS

| | | | |
|---|---|---|---|
| 5,490,141 | 2/1996 | Lai et al. | 370/352 |
| 5,600,643 | 2/1997 | Robrock, II | 370/399 |
| 5,623,491 | 4/1997 | Skoog | 370/397 |

*Primary Examiner*—Alpus H. Hsu
*Attorney, Agent, or Firm*—Kirschstein et al.

[57] ABSTRACT

In a telecommunications system interconnection is made between a broadband network and a narrowband PABX by an interworking unit providing conversion between the cell based switching of the broadband network and the circuit switching of the narrowband PABX, whereby broadband network users have access to PABX telephony facilities. The broadband network may be ATM based.

2 Claims, 10 Drawing Sheets

BROADBAND/NARROWBAND INTERWORKING

BACKGROUND OF THE INVENTION

The present invention relates to an interworking unit for use on a broadband campus network which will interconnect the broadband network with a narrowband PABX. The unit will provide conversion between the cell based switching of the broadband network and the 64 Kbit circuit switching of the narrowband PABX. In order to enable the broadband users to have access to the normal PABX style telephony facilities, the interworking unit will adapt the broadband signalling to narrowband signalling.

A basic block diagram of a typical system is shown in FIG. 1.

SUMMARY OF THE INVENTION

According to the present invention there is provided a telecommunications system wherein interconnection is made between a broadband network and a narrowband PABX comprising an interworking unit providing conversion between the cell-based switching of the broadband network and the circuit switching of the narrowband PABX, whereby broadband network users have access to PABX telephony facilities.

BRIEF DESCRIPTION OF THE DRAWINGS

The present invention will now be described, by way of example with reference to the accompanying drawings, in which.

DETAILED DESCRIPTION

Figure 1:
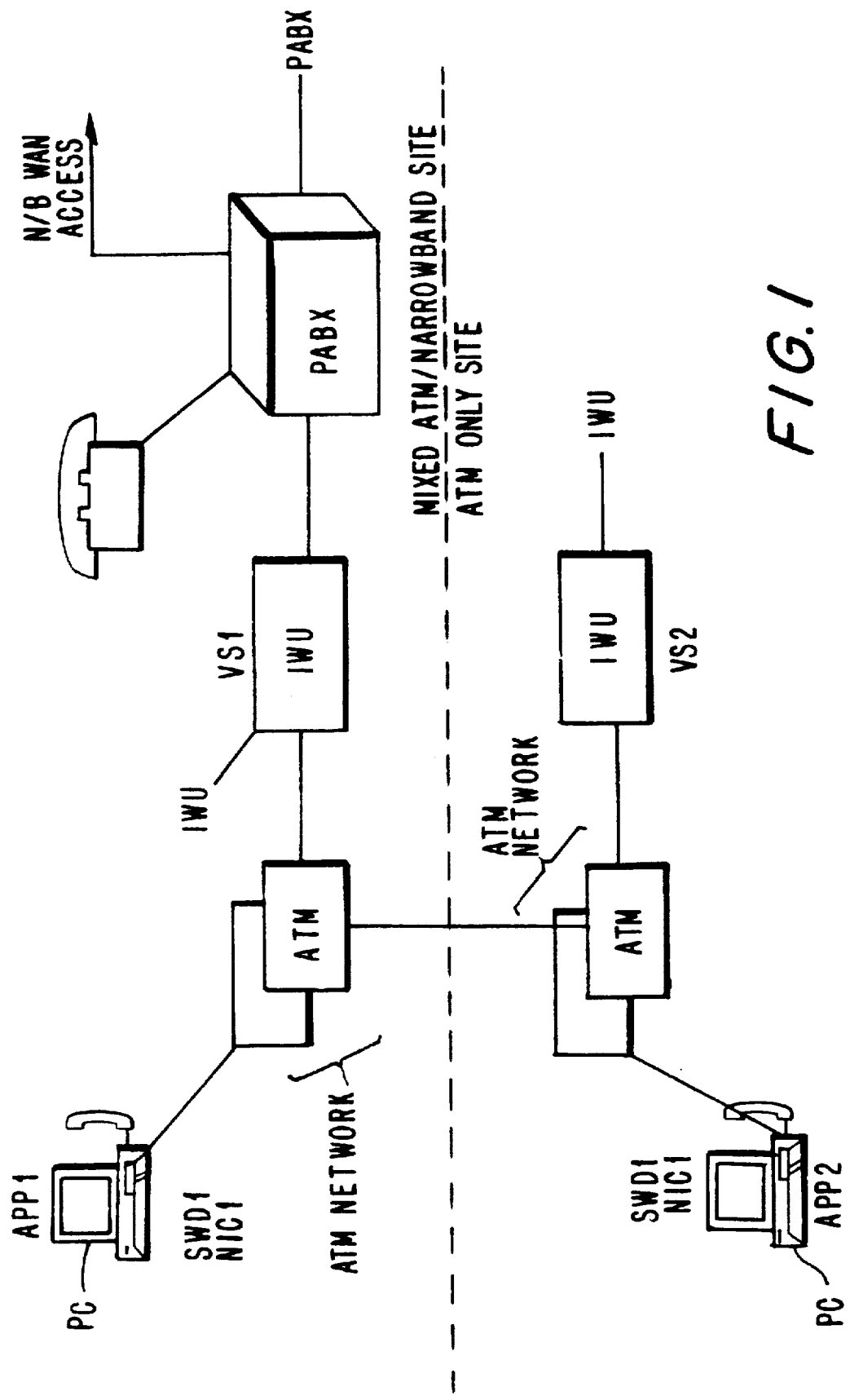
FIG. 1 is a block diagram of a telecommunications system including the present invention.
Figure 2:
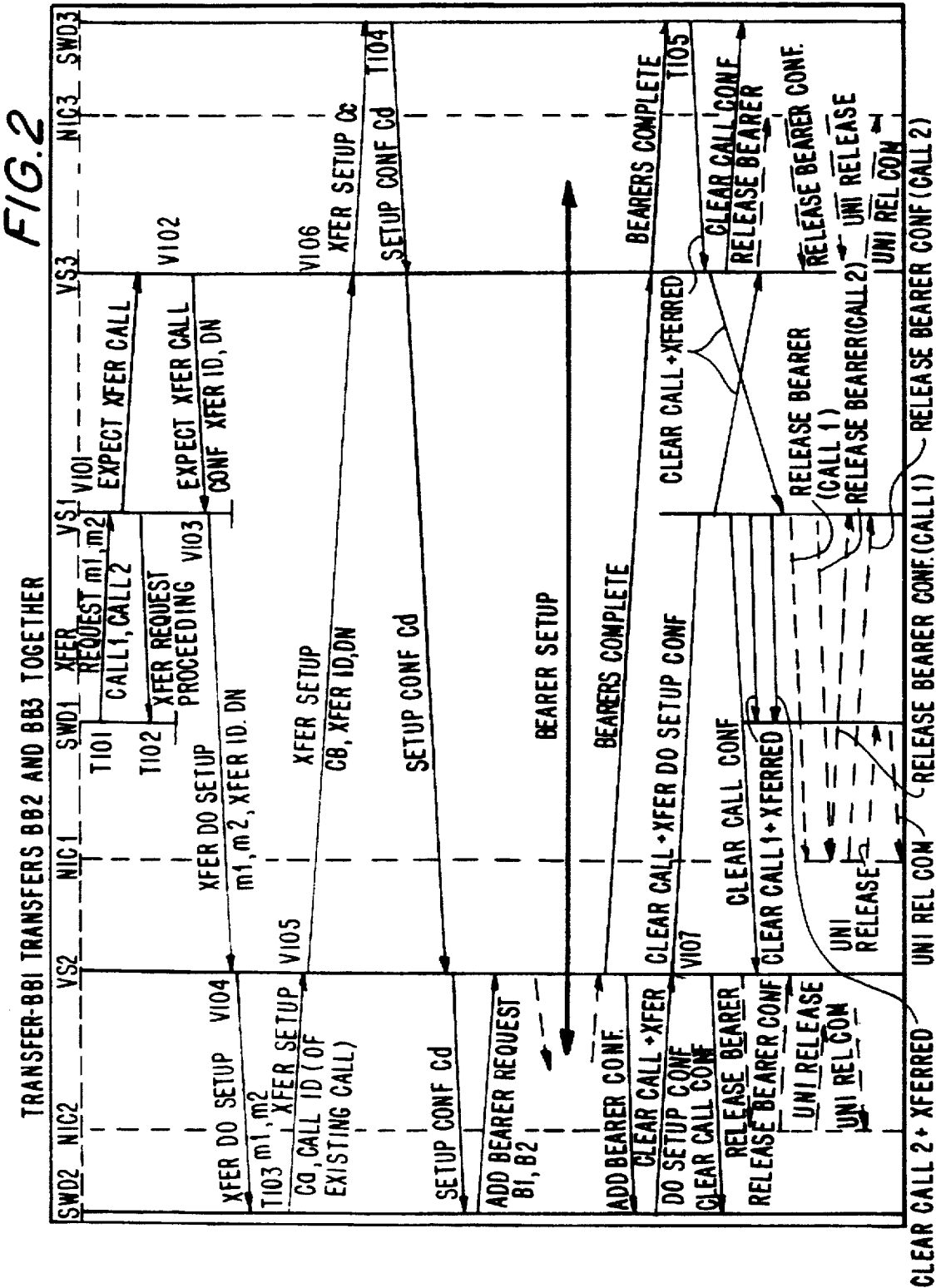
FIGS. 2–10 are sequence diagrams illustrating the function of the present invention.
Figure 3:
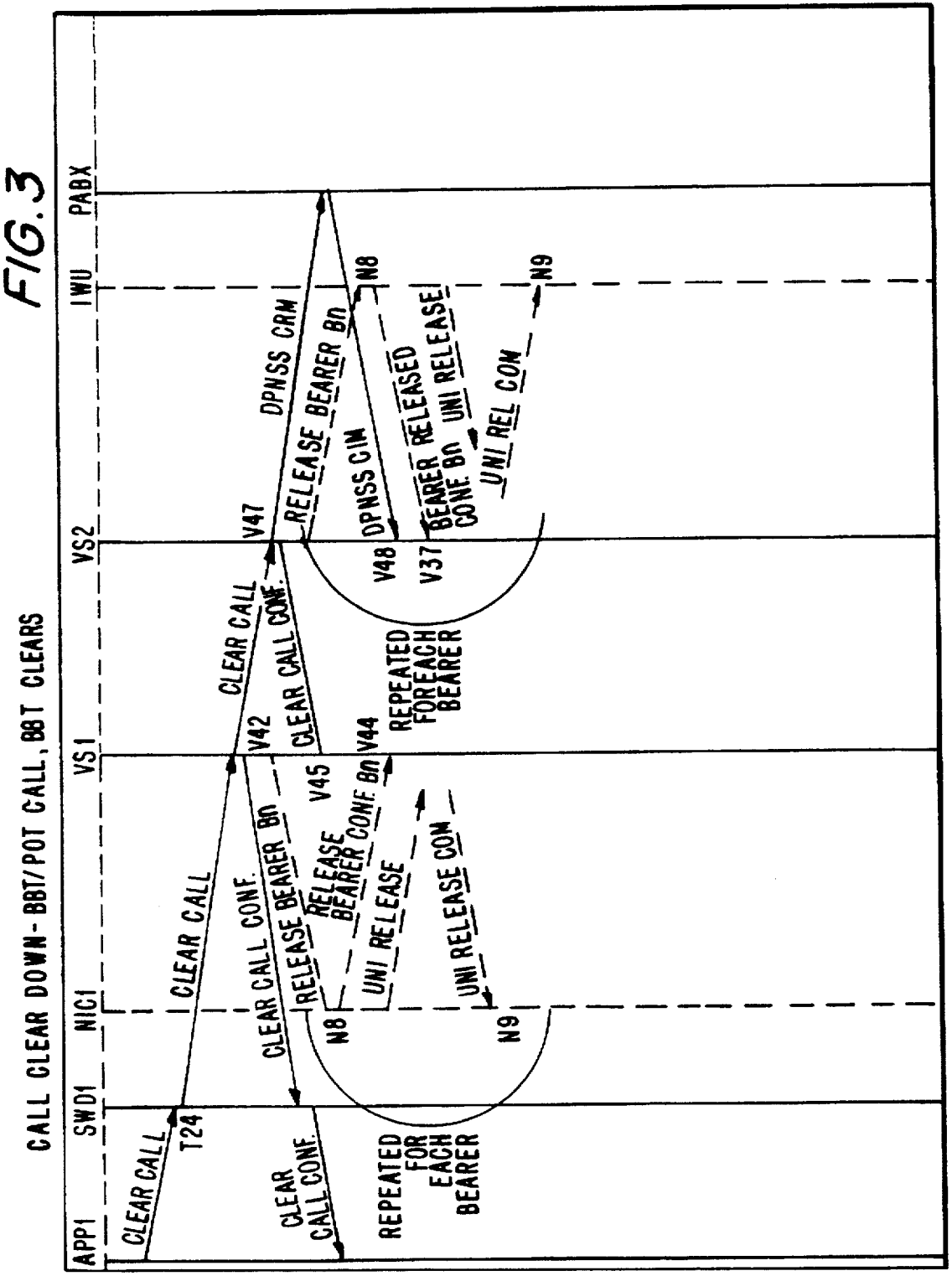
Figure 4:
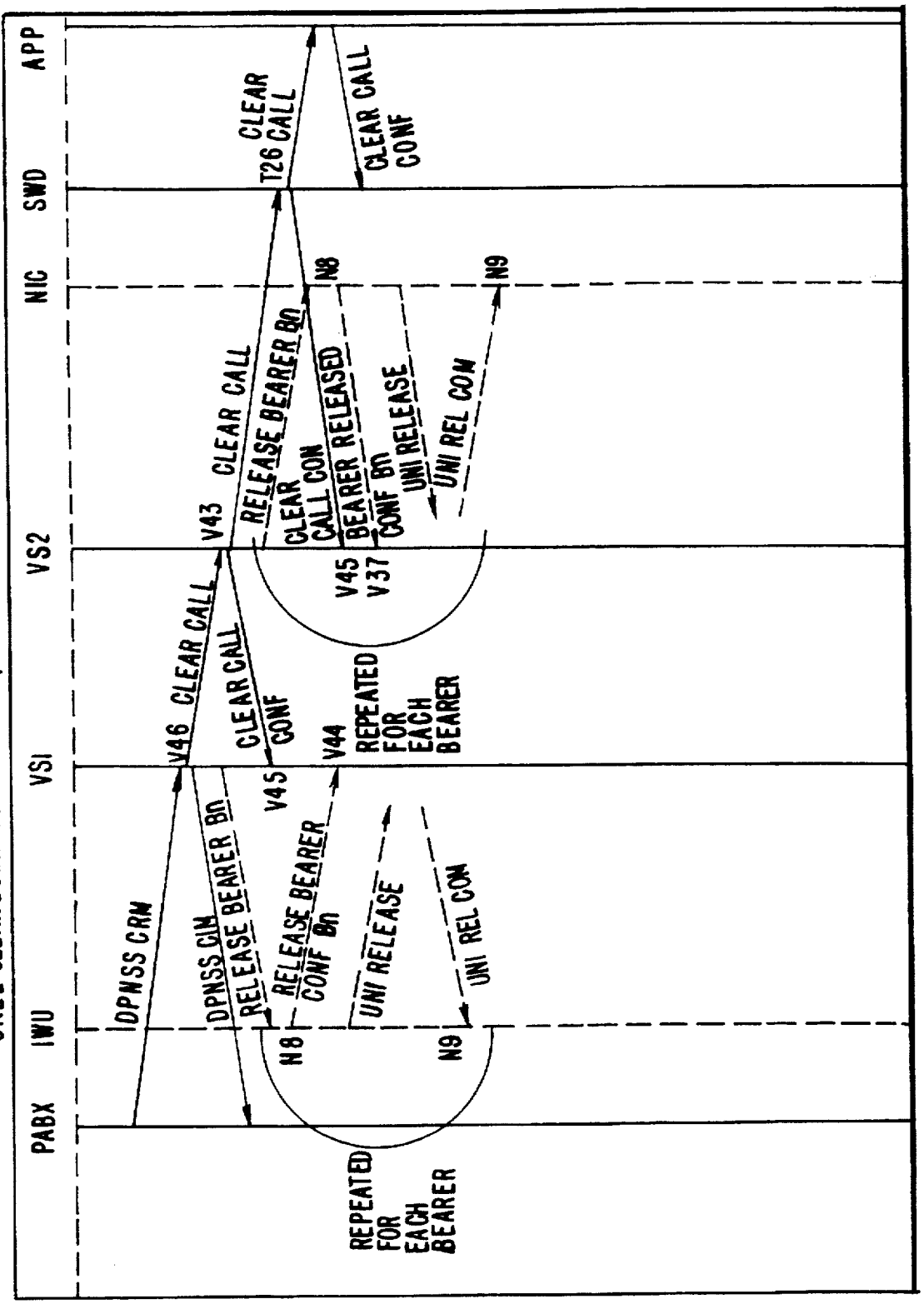
Figure 5:
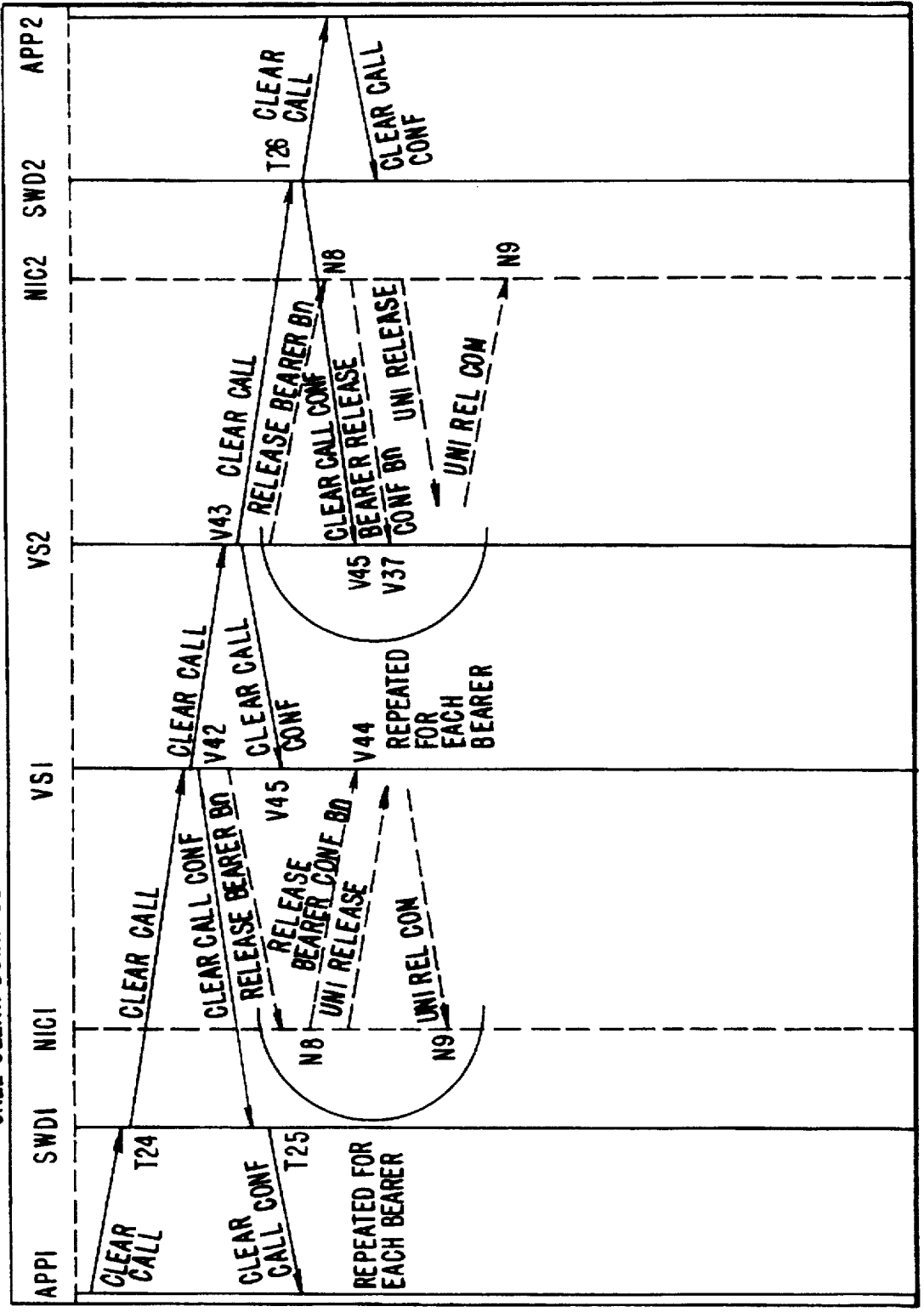
Figure 6:
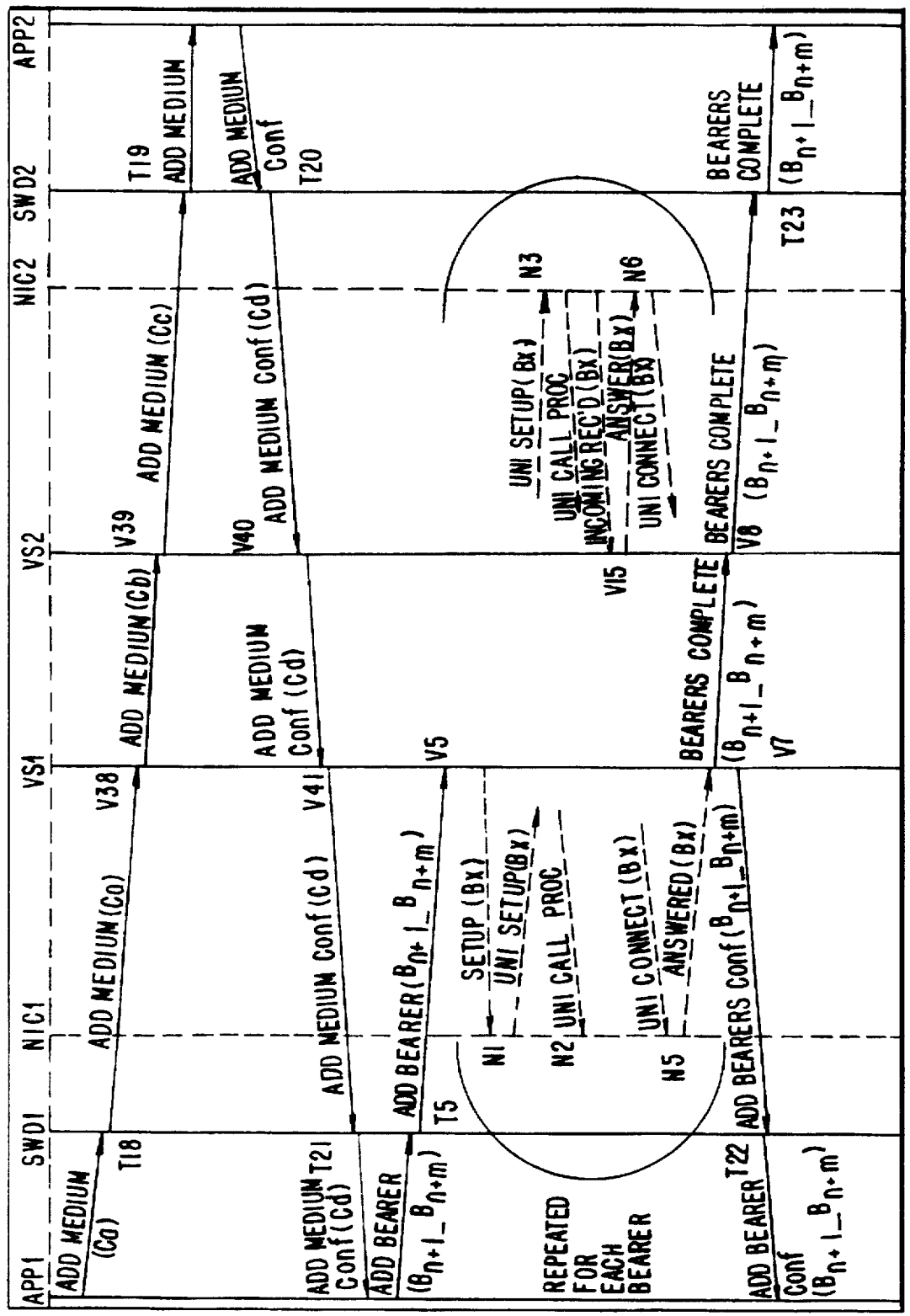
Figure 7:
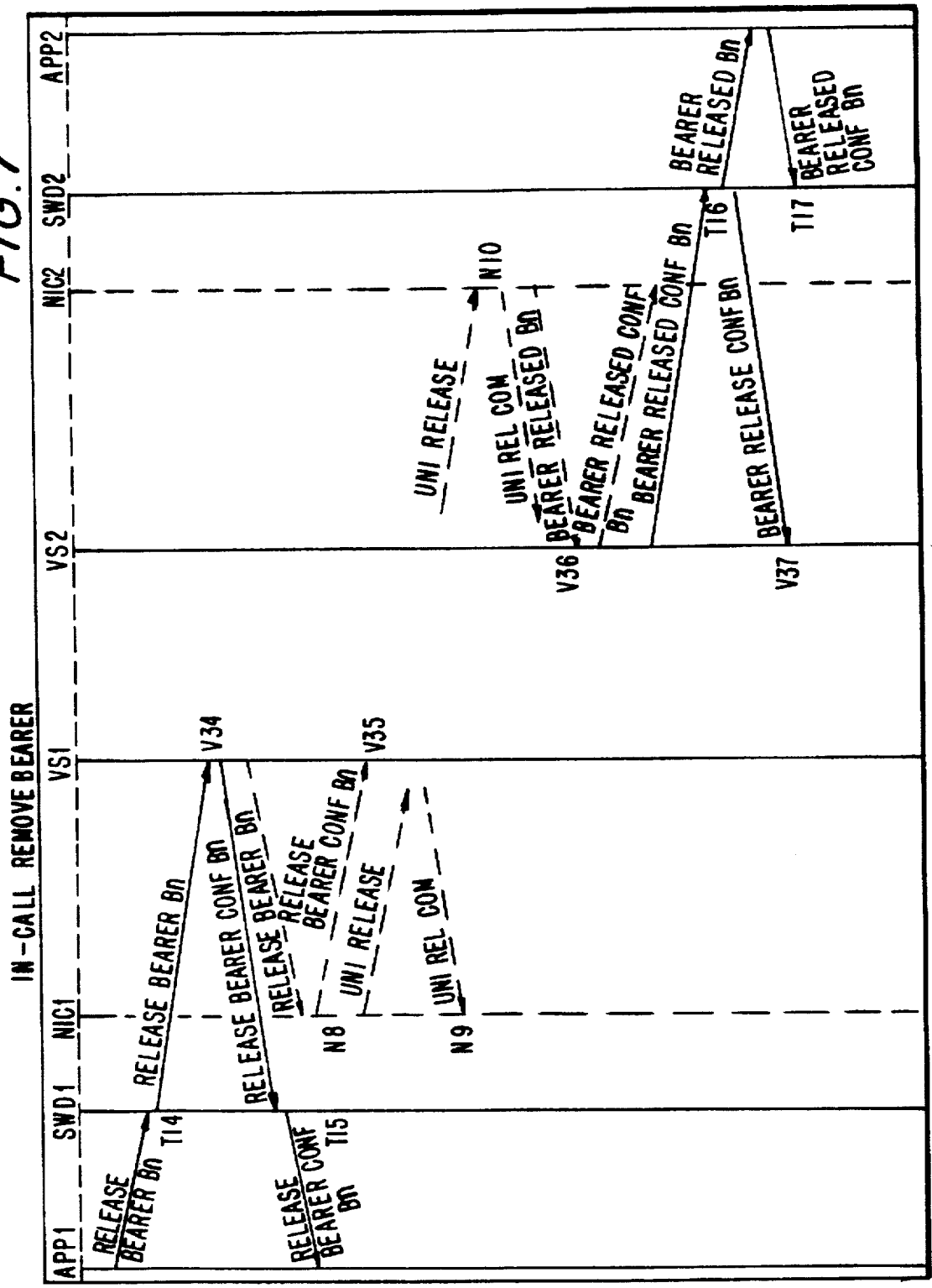
Figure 8:
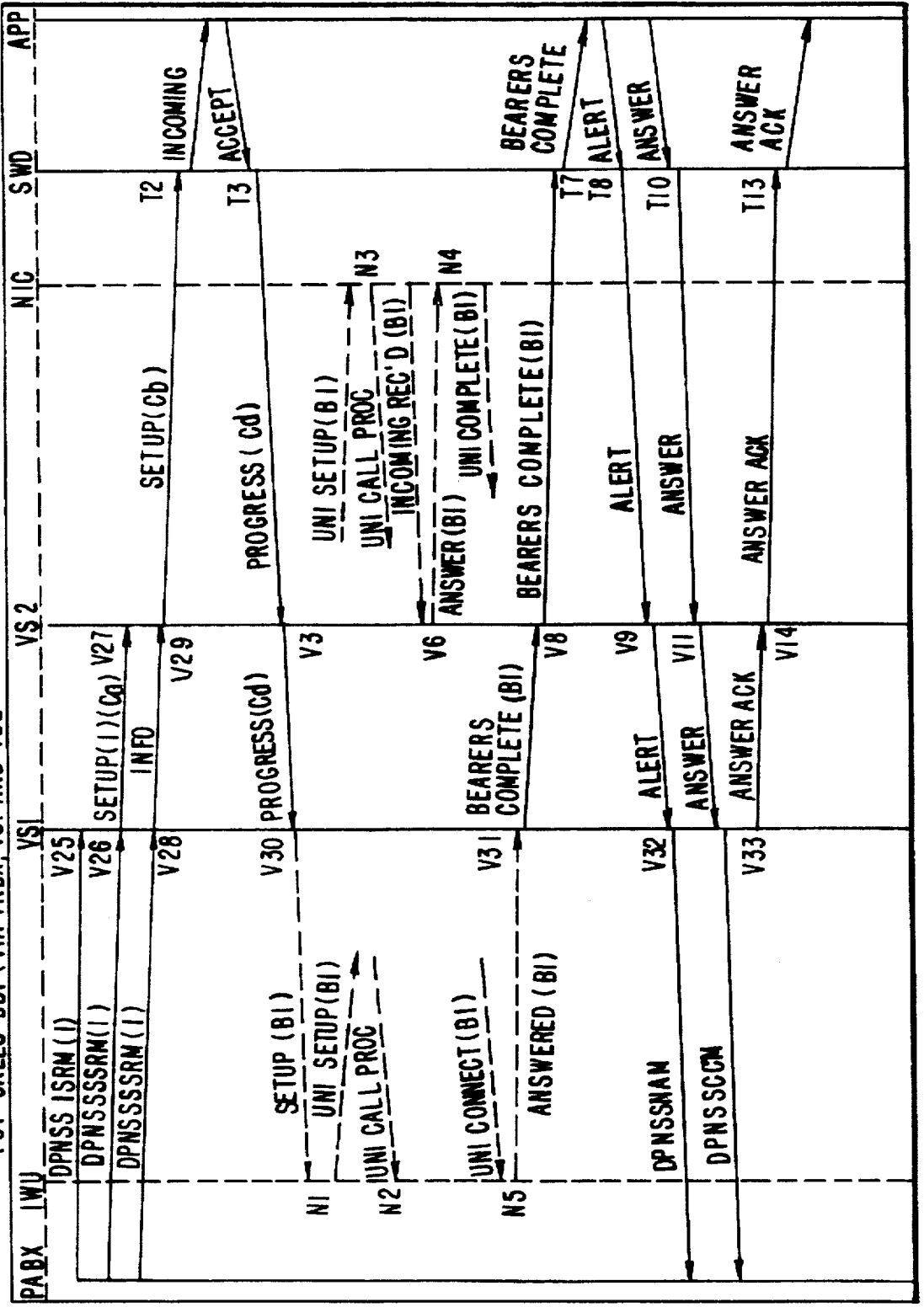
Figure 9:
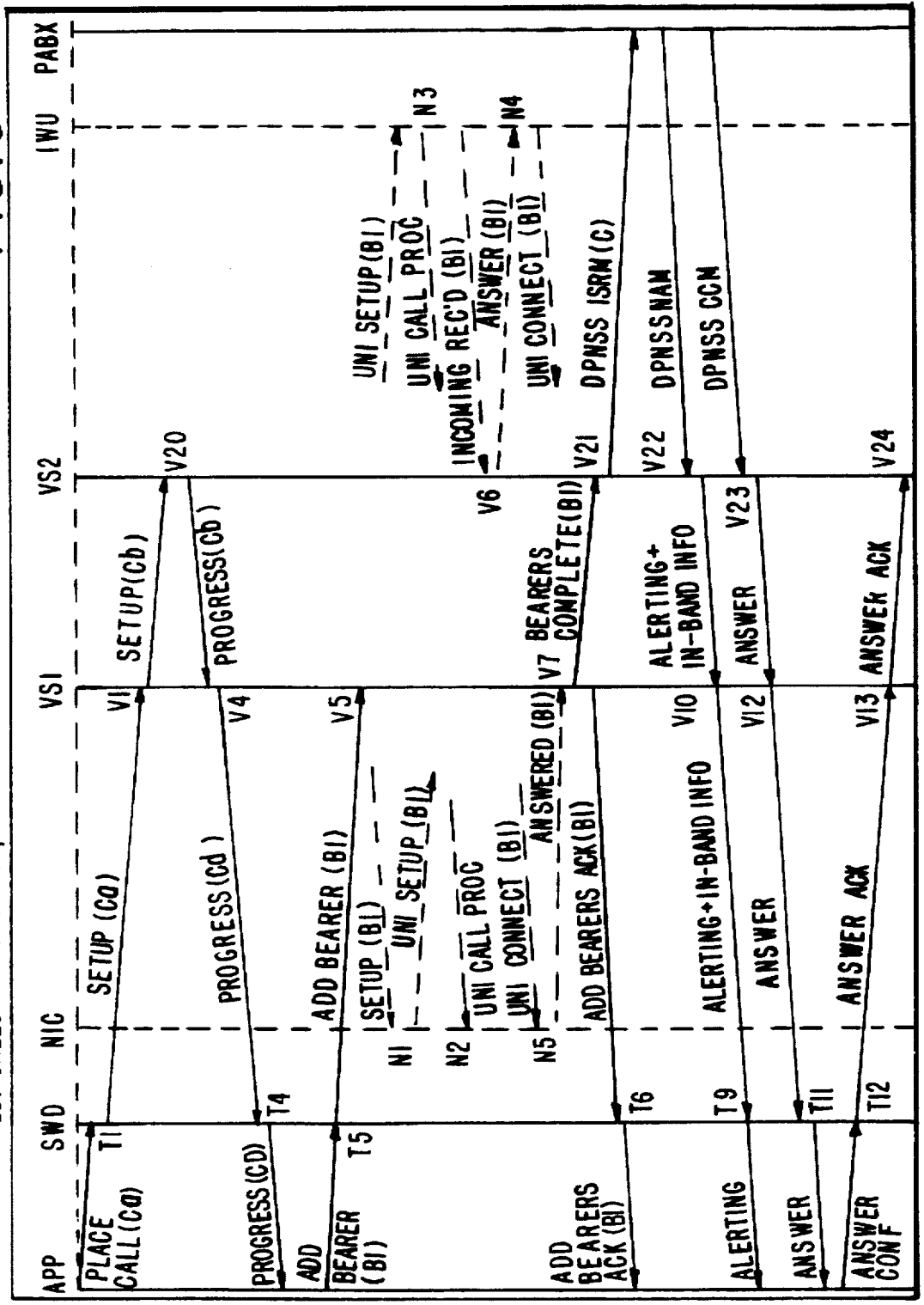
Figure 10:
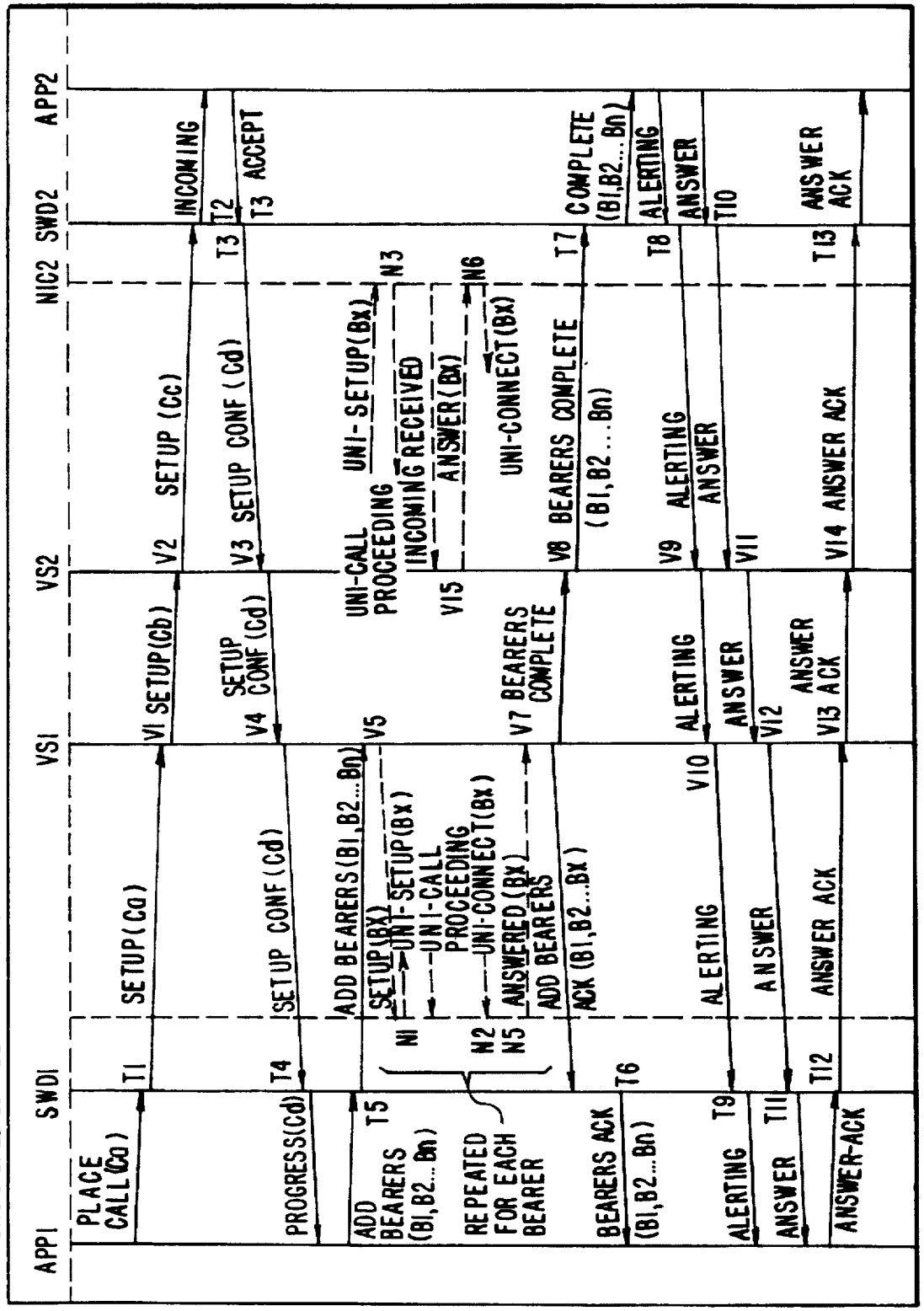

The system consists of the interworking unit, the broadband terminal components and a range of ATM switching systems and servers as shown in FIG. 1. The diagram shows two sites, one with mixed ATM and conventional PABX equipment, the other with an ATM only PABX. For simplicity no wide area ATM connections are shown. The ATM system and servers provide local area network functionality for the users data requirements. The terminal components are a voice and video card, camera and audio input and output. The ATM terminal contains the software components shown on the attached signalling sequence diagrams (FIGS. 2–10) namely the application (APP), the switch driver (SWD) and the ATM network interface card driver (NIC).

The interworking unit (IWU) typically would contain ATM to 64 kbit/s conversion and the signalling interworking functionality, though other bit rates may be used. This interworking unit is connected into a standard PABX network using primary rate connections incorporating standard signalling protocols such as DPNSS, QSIG or Cornet-N. The signalling flows which will allow the use of the narrowband call control functionality to create broadband calls and the interleaving with broadband bearer control to establish multiple bearers for the call.

When the broadband terminal equipment is powered up, the driver APP in the Personal Computer (PC) establishes a signalling connection to the interworking unit for the telephony style functionality. This connection will be made to an ATM 'well known address' which is stored in the APP software driver. This connection will be a long hold time switched virtual circuit (SVC), that is a connection which will be held up until either the terminal is powered down, or the ATM switch network identifies a failure. In the event of failure of the network the terminal will re-establish another SYC to the well known address.

When a telephony class call (voice or voice and video) is to be established, the APP driver will send a 'place call' message to the SWD. The SWD will generate a Q931 based 'set up' message to the voice server call processing VS. This signalling is based on Q931 for the terminal with extensions for broadband requirements such as preferences. The call preferences are information such as voice, voice and video, video and data. These call preferences may be negotiated down but not up by the intervening call control entities (VS) in the interworking unit or by the end terminal preferences in the called terminal APP. Should there be any alteration of the destination terminal due to the invocation of PABX style features such as call forward the call will proceed to the new end station. Once the call preferences have been agreed by the end terminal a proceeding message will be returned to the calling terminal.

The calling terminal will now request bearer channels. The originating APP will initiate 'add bearer' requests to the SWD element. This will cause the NIC driver to utilise the Q2931 broadband signalling protocol to establish bearer channels as required to the agreed destination. The Q2931 bearer establishment does not involve the interworking unit unless the call is to be terminated onto a narrowband terminal or trunk connected to the narrowband system. In the above diagram the only narrowband connections are on the PABX entity connected to VSl. The IWU VS2 is only providing voice, or voice and video control for the ATM terminals on the ATM only site.

Once all of these bearer channels are established, the terminal call control will now send an alerting message to the called terminal. The answering of the call will establish all of the required connection for the multimedia call to take place.

The message sequence charts in FIGS. 2–10 indicate the method of dealing with selected PABX style feature invocation. The calls are presented as for the basic call but during call progress a change to the originally addressed terminal is determined by the call processing software in VS which results in a diversion. Similarly a broadband user may require an enquiry, or a transfer to another terminating station.

Actions for BBT-BBT basic call

These actions refer to the corresponding references on the information flow sequence diagrams (FIGS. 2–10). Starting and stopping of timers has deliberately been omitted.

Basic call between broadband terminals

T1 Interpret application's request for call and offered services and parameters; check on availability of resources to support offered services; reserve resources; send Setup to VS1.

V1 Interpret Setup from SWD1; check entitlement of calling user to offered services and parameters and remove those to which no entitlement (reject call if not entitled to any); analyse called party number (reject call if invalid) and route call towards destination; send Setup to VS2.

V2 Interpret Setup from VS1; determine that called party number relates to local user; check entitlement of called user to offered services and parameters and remove those to which no entitlement (reject call if not entitled to any);

check on current availability of user (e.g. powered down, VS-determined busy, forwarding and DND requirements) (reject call or take alternative action if not available); send Setup to SWD2.

T2 Interpret Setup from VS2; find application that can be offered the call (reject if none); inform application of incoming call.

T3 Receive application's acceptance of incoming call; reserve resources in line with selected service and parameters; send Setup Conf to VS2 indicating selected service and parameters.

V3 Interpret Setup Conf from SWD2; record selected service and parameters and prepare to receive bearers in support; obtain ATM address per bearer (i.e. for NIC2); send Setup Conf to VS1.

V4 Interpret Setup Conf from VS2; record selected services and parameters and prepare to establish bearers in support; record ATM address for NIC2; send Setup Conf to SWD1.

T4 Interpret Setup Conf from VS1; record selected services and parameters; release any unwanted resources; inform application that call accepted.

T5 Receive instruction to establish bearers; determine detailed bearer parameters; send AddBearers to VS1.

V5 Receive AddBearers from SWD1; for each required bearer, check bearer parameters acceptable, send Setup to NIC1.

N1 Receive Setup from VS1; send UNI SETUP to WGS.
NOTE: This action repeated for each bearer.

N2 Receive UNI CALL PROCEEDING; record allocated VPI/VCI.

N3 Receive UNI SETUP from WGS; send Incoming Received to VS2.
NOTE: This action repeated for each bearer.

V6 Interpret Incoming Received from NIC2 and associate with existing incoming call (reject bearer if unable to associate); record bearer details; send Answer to NIC2.
NOTE: This action repeated for each bearer.
NOTE: Alternatively NIC2 could be instructed to send UNI ALERTING TO WGS. This possibility is not available with UNI 3.1. The bearer would then have to be answered when the call is answered or if in-band information is provided to the calling user during the alerting phase of the call.

N4 Receive Answer from VS2; send UNI CONNECT to WGS.

N5 Receive UNI CONNECT from WGS; send Answered to VS1.

V7 Receive Answered from NIC1; record bearer answer details; if no more bearers being established, send AddBearersConf to SWD1 and BearersComplete to VS2.

V7bis (Does not occur in sequence diagram) Receive Rejected from NIC1; record bearer not available; if bearer optional and no more bearers being established, send AddBearersConf to SWD1 and BearersComplete to VS2; if bearer mandatory, send Release to NIC1 for each bearer and release call.

V8 Receive BearersComplete from VS1; stop expecting any further bearers; send BearersComplete to SWD2.

T6 Receive AddBearersConf from VS1; record bearer details; release any unwanted resources; indicate bearers established to application.

T7 Receiver BearersComplete from VS2; record bearer details; release any unwanted resources; indicate bearers complete to application.

T8 Receive alerting indication from application; send Alerting to VS2; if in-band information supplied on any bearer, include "in-band information present" and bearer ID.

V9 Receive alerting from SWD2; send Alerting to VS1.

V10 Receive Alerting from VS2; send Alerting to SWD1.

T9 Receive Alerting from VS1; if indication of "in-band information present" on any bearer, connect local resources to that bearer for receive only; otherwise apply local ring tone/announcement/image etc., as appropriate; indicate alerting to application.

T10 Receive answer indication from application; connect local resources to bearers; send Answer to VS2.
NOTE: The application should be prepared to receive information from the bearers at this stage. Although the application may transmit at this stage, it should be in the knowledge that the calling application might not yet be ready to receive. Therefore some applications will need to wait for an answer confirmation. However, if the calling application has been informed of in-band information during the alerting phase, it can be assumed to be already receiving.

V11 Receive Answer from SWD2; send Answer to VS1.

V12 Receive Answer from VS2; send Answer to SWD1.

T11 Receive Answer from VS1, connect local resources to bearer for transmit and receive; indicate answer to application.

T12 Receive answer confirmation indication from application; send Answer Confirmation to VS1.
NOTE: Sending Answer Confirmation confirms that the application is at least able to receive information on the various bearers.

V13 Receive Answer Confirmation from SWD1; send Answer Confirmation to VS2.

V14 Receive Answer Confirmation from VS1; send Answer Confirmation to SWD2.

T13 Receive Answer Confirmation from VS2; indicate answer confirmation to application; connect local resources for transmit and receive if not already done so.

Additional actions for deferred answering of bearers

V15 Interpet IncomingReceived from NIC2 and associate with existing incoming call (reject bearer if unable to associate); record bearer details, send Alerting to NIC2.

N6 Receive Alerting from VS2; send UNI ALERTING TO WGS.

N7 Receive UNI ALERTING from WGS; send Alerting to VS1.

V16 Receive Alerting from NIC1; record bearer alerting details; if no more bearers being established, send AddBearersConf to SWD1 and BearersComplete to VS2.

V17 Receive Answer from SWD2; for each bearer that has not been answered, send Answer to NIC2; send Answer to VS1.

V18 Receive Answer from VS2; if all bearers already answered, send Answer to SWD1; else wait.

V19 Receive Answered from NIC1; if all bearers now answered and Answer already received from VS2, send Answer to SWD1; else wait.

Additional actions for interworking broadband terminal to narrow-band DPNSS

V20 Interpret Setup from VS1; determine that called party number relates to narrow-band DPNSS route; check ability to support offered media and parameters in narrow-band and remove those that cannot be supported (reject call if cannot support any); record selected medium and parameters and prepare to receive bearer in support; obtain ATM address for NIC2; send Setup Conf to VS1.

V21 Receive Bearers complete from VS1; check single bearer received that is compatible with narrow-band; select DPNSS B-channel; send ISRM(C).

V22 Receive DPNSS NAM; send Alerting "in-band information present" to VS1.

V23 Receive DPNSS CCM; send Answer to VS1.
V24 Receive Answer Confirmation from VS1.
Additional actions for interworking narrow-band DPNSS to broadband terminal
V25 Receive DPNSS ISRM(I); determine there are insufficient digits to route.
V26 Receive DPNSS SSRM(I); determine that routeing to VS2 required; send Setup (incomplete) to VS2 indicating 64 kbit/s/s medium and parameters.
V27 Receive Setup (incomplete) from VS1; determine there are insufficient digits to route.
V28 Receive DPNSS SSRM(I); send INFORMATION (incomplete) to VS2.
V29 Receive INFORMATION (incomplete) from VS1; determine that called party number relates to local user; check entitlement of called user to offered medium and parameters (reject call if not entitled); check on current availability of user (e.g. powered down, VS-determined busy, forwarding and DND requirements (reject call or take alternative action if not available); send Setup to SWD2.
V30 Interpret Setup Conf from VS2; record ATM address for NIC2; determine bearer parameters; send Setup to NIC1.
V31 Receive Answered from NIC1; record bearer answer details; send BearersComplete to VS2.
V32 Receive Alerting from VS2; connect ring tone (if applicable) to DPNSS B-channel; send
V33 Receive Answer from VS1; disconnect ring tone and connect VC to DPNSS B-channel; send DPNSS CCM; send Answer Acknowledge to VS2.
Additional action for In-call bearer removal
T14 Receive instruction to release bearer; disconnect and release resources; send Release Bearer to VS1.
V34 Receive Release Bearer from SWD1; check bearer is established (reject if not); send Release Bearer Conf to SWD1; send Release Bearer to NIC1.
T15 Receive Release Bearer Conf from VS1; send Release Bearer Conf to APP1.
N87 Receive Release Bearer from VS1; send Release Bearer Conf to VS1; send UNI Release to WGS.
V35 Release Bearer Conf received from NIC1; record bearer released; if this was the only bearer start a timer for release of the call.
N98 Receive UNI Rel Com from WGS; release VPI/VCI.
N109 Receive UNI Release from WGS; send UNI Rel Com to WGS; send Bearer Released to VS2; release VPI/VCI.
V36 Receiver Bearer Released from NIC2; record bearer released; if this was the only bearer start a timer for release of the call; send Bearer Released Conf to SWD2; send Bearer Released to SWD2.
T16 Receive Bearer Released from VS2; record bearer released; release any unwanted resources; send Bearer Released to application; send Bearer Released Conf to VS2.
V37 Receive Bearer Released Conf from SWD2; actions?
T17 Receive Bearer Released Conf from APP2; actions?
Additional actions for In-call bearer addition
NOTE: Bearers can only be added after call connection.
NOTE: Medium requests cannot be made in parallel with each other.
NOTE; Bearers can be requested by either party.
NOTE: Bearers will always be established from the requesting party, therefore some bearers may be set up from called to calling party.
NOTE: If both terminals request the same medium at the same time, both applications may be rejected. It is proposed that this collision case is dealt with in the terminal, e.g. by using a special clearing cause and starting a random timer before re-requesting.
T18 Receive Add Medium request from application; check on availability of resources to support offered services; reserve resources; send Add Medium request to VS1.
V38 Receive Add Medium from SWD1; check entitlement of calling user to requested services and parameters and remove those to which no entitlement (reject call if not entitled to any); send Add Medium to VS2.
V39 Receive Add Medium from VS1; check entitlement of called user to requested services and parameters and remove those to which no entitlement (reject call if not entitled to any); send Add Medium to SWD2.
T19 Receive Add medium from VS2; inform application of medium request.
T20 Receive applications's acceptance of Add Medium request; reserve resources in line with selected service and parameters; send Add Medium Confirmation to VS2 indicating selected service and parameters.
V40 Receive Add Medium Conf from SWD2; record selected service and parameters and prepare to receive bearers in support; obtain ATM address for each bearer (i.e. NIC2); send Add Medium Conf to VS1.
V41 Receive Add Medium Conf from VS2; record selected service and parameters and prepare to establish bearers in support; record ATM address for each bearer; send Add Medium Conf to SWD1.
T21 Receive Add Medium Conf from VS1; record selected service and parameters; release any unwanted sources.
T22 Receive AddBearersConf from VS1; record bearer details; release any unwanted resources; connect local resources to bearers; indicate bearers established to application.
T23 Receive BearersComplete from VS2; record bearer details; release any unwanted resources; connect local resources to bearer; indicate bearers complete to application.
Additional actions for BBT1-BBT2 Call Clear Down (bearers cleared from both ends)
T24 Receive ClearCall message from Application; send ClearCall message to VS1.
V42 Receive ClearCall message from SWD1; send ClearCallConf to SWD1; send ClearCall message to VS2; send ReleaseBearer to NIC1.
NOTE: A VS does not clear its state machine for a call until all associated bearers have been released.
T25 Receive ClearCallConf from VS1; send ClearCallConf to the application.
V43 Receive ClearCall from VS1; send ClearCallConf to VS1; send ClearCall to SWD2; send ReleaseBearer for each bearer to NIC2.
V44 Receive ReleaseBearerConf from NIC1; if this is the last bearer then treat call as cleared.
T26 Receive ClearCall from VS2; send ClearCallConf to VS2; send ClearCall to application.
V45 Receive CleaCallConf from VS.
Additional actions for BBT-POT Call Clear Down-POT clears (bearers cleared from both ends)
V46 DPNSS CRM received from VS1; DPNSS CIM sent to PABX; ReleaseBearer message sent IWU; ClearCall message sent to VS2.
NOTE: A VS does not clear its state machine for a call until all associated bearers have been released.
Additional actions for BBT-POT Call Clear Down-BBT clears (bearers cleared from both ends)
V47 Receive ClearCall from VS1; send ClearCallConf to VS1; send DPNSS CRM to PABX.

V48 Receive DPNSS CIM from PABX.

NOTE: A VS does not clear its state machine for a call until all associated bearers have been released.

Actions for Transfer (BB1 transfers BB2 and BB3 together)

T101 Transfer requested by application; identify common media between the two calls; send XferRequest in context of existing call.

NOTE: The media requested by SWD1 should be marked as mandatory or optional.

V101 Receive XferRequest from SWD1; validate request (reject if invalid) and record details of media and calls; send confinnation to SWD1; send ExpectXferCall to VS3.

T102 Receive XferRequestProc from VS1; indicate transfer is proceeding to SWD1.

V102 Receive Expect XferCall from VS1; generate and record Xfer identity and DN (the DN will be used by VS2 to route the call to VS3); send ExpectXferCallConf to VS1.

V103 Receive ExpectXferCallConf from VS1; send XferDoSetup to VS2 including m1, m2, Xfer id and DN.

NOTE: VS1 does not modify m1 or m2.

V104 Receive XferDoSetup from VS1; record Xfer id and DN; send XferDoSetup to SWD2.

NOTE: For security reasons (e.g. BBT3 is ex-directory) VS2 does not pass on the DN to SWD2.

T103 Receive XferDoSetup from VS2; send XferSetup to VS2 with capability set Ca consistent with m1, m2.

V105 Receive XferSetup from SWD2; relate XferSetup to original call; retrieve Xfer id and DN; send XferSetup to VS3.

V106 Receive XferSetup from VS2; use Xfer id to associate Xfer call with original call; send CferSetup to SWD3.

T104 Receive XferSetup from VS3; send SetupConf (as per basic call) to VS3.

What we claim is:

1. A telecommunications system for interconnecting a broadband network having cell-based switching and a narrowband PABX network having circuit switching. the system comprising:

an interworking unit for converting between the cell-based switching and the circuit switching to provide users of the broadband network with access to the narrowband network, and a signaling connection from the broadband network to the interworking unit, said signaling connection being a long hold time switched virtual circuit controlled by existing signaling from the narrowband network during operation of the broadband network.

2. The system as claimed in claim 1. wherein the interworking unit is operative for converting at a rate of 64 kbit/sec.

* * * * *